United States Patent [19]

Gerpheide et al.

[11] Patent Number: 5,767,457
[45] Date of Patent: Jun. 16, 1998

[54] APPARATUS AND METHOD FOR AUDIBLE FEEDBACK FROM INPUT DEVICE

[75] Inventors: George E. Gerpheide; Arthur Griffin; Anil Sabbavarapu, all of Salt Lake City, Utah

[73] Assignee: Cirque Corporation, Salt Lake City, Utah

[21] Appl. No.: 558,126

[22] Filed: Nov. 13, 1995

[51] Int. Cl.⁶ .............................. G08C 21/00; G09G 3/02
[52] U.S. Cl. ........................... 178/18; 178/19; 345/156; 345/157; 345/173
[58] Field of Search .................. 178/18, 19; 345/156, 345/157, 173, 179

[56] References Cited

U.S. PATENT DOCUMENTS

| | | | |
|---|---|---|---|
| 4,482,784 | 11/1984 | Whetstone | 178/19 |
| 4,794,634 | 12/1988 | Torihata | 178/18 |
| 4,896,223 | 1/1990 | Todome | 345/173 |
| 5,308,936 | 5/1994 | Biggs | 178/18 |
| 5,325,478 | 6/1994 | Shelton | 395/148 |
| 5,327,161 | 7/1994 | Logan et al. | 345/157 |

Primary Examiner—Curtis Kuntz
Assistant Examiner—Vijay Shankar
Attorney, Agent, or Firm—Thorpe, North & Western, LLP

[57] ABSTRACT

A method and apparatus for developing an audible feedback in the form of a response signal to a tapping motion, a gesture or a series of taps or gestures on an electronic touch-sensitive computer input device which uses an electronic switch having no mechanical switch component. In particular, the present invention is beneficial for a touch-sensitive input device a touch-pad or stylus and tablet because it is difficult for the user to know whether a tapping motion is perceived by the device's sensing circuitry. The method is less than perfectly reliable because it is often difficult for the user to know whether sufficient pressure was applied to the touch-sensitive surface of the device, or whether contact was made for a sufficient amount of time. Consequently, the user must wait to see if the computer responds in the desired manner. If not, the user must repeat the motion. In order to overcome losing the benefit of an audible mechanical switch, the present invention provides an audible response signal which generates a sound for each individual tap or gesture only after the entire combination of taps or gestures is entered and a counter times out, after each individual tap or gesture, or a combination of the two methods. The apparatus of the present invention preferably includes a non-mechanical electronic touch-sensitive touch-pad or stylus and tablet, an associated processing device such as a computer, and a sound producing circuit coupled to the system.

22 Claims, 10 Drawing Sheets

APPARATUS AND METHOD FOR AUDIBLE FEEDBACK FROM INPUT DEVICE

BACKGROUND OF THE INVENTION

1. Field of the Invention

This invention pertains to computer input and pointing devices used to control cursor movement on a display. More particularly, this invention pertains to touch sensitive data input and pointing devices for data input to computers and other devices which benefit from interaction with a user.

2. Prior Art

Input devices for computers are well known in the art. There are several types of input devices including the familiar "mouse." The mouse has become so popular because, when combined with a graphical user interface (GUI), it is so much easier to use than typed keyboard commands. The mouse has been accepted as a "user friendly" input device for both experienced and novice computer users. The popularity which the mouse has achieved in the art can be given large credit for fostering the explosive growth of the personal computer industry since a mouse provides a simple means for users to input data to a computer.

While mice are currently the most popular non-keyboard input device, a mouse generally requires a free-rolling surface, i.e. a table top, on which it can operate. Disadvantageously, a mouse is not well suited for use in cramped spaces or with a portable computer, particularly laptop, notebook, sub-notebook, and palmtop computers. In answer to the long existing need for a more convenient input device suitable for both portable and desktop computers, various alternative input devices have been proposed. Such alternative input devices include devices commonly referred to as track balls, track pens, track point devices, as well as various devices which sense the position of a pointing object on a position sensing surface. The devices which sense the position of a pointing object on a sensing surface generally have the advantages of being simple to use, being easily integrated with current computers and other computing devices, reliability, ruggedness, compactness, and the ability to be transported and used in a variety of locations.

Numerous types of input devices utilize a position sensing surface. Examples are provided in the following patent references: U.S. Pat. No. 3,886,311, Rodgers et al.(Writing pen for detecting time varying electrostatic field produced by a writing tablet); U.S. Pat. No. 4,672,154, to Rodgers et al. (Cordless stylus which emits a directional electric field from the tip of a conductive pen cartridge sensed by a digitizer tablet having an X-Y coordinate system); U.S. Pat. No. 4,680,430 to Yoshikawa et al. (A tablet-like coordinate detecting apparatus including a resistive film for determining the coordinate position data of a point on a plane indicated by the touch of a finger tip or other load); U.S. Pat. No. 4,103,252 to Bobick (A position sensing tablet with electrodes located on the boundaries of a sensing region which detects a human touch by the change in capacitive charge caused by the touch which varies the time constant of an RC network which is part of an oscillator); U.S. Pat. No. 4,736,191 to Matzke (A touch activated control device comprising individual conductive plates wherein a user's touch on the dielectric layer overlaying the plates is detected by individually charging and discharging each of the sectors in the plates in a sequential manner to determine the increased capacitance of the sector); U.S. Pat. No. 4,550,221 to Mabusth (A touch sensitive control device which translates touch location to output signals and which includes a substrate that supports first and second interleaved, closely spaced, non-overlapping conducting plates); U.S. Pat. No. 4,639,720 to Rympalski et al. (An electronic sketch pad which contains a graphics input pad having an array of transparent capacitive pixels, the capacitance characteristics of which are changed in response to the passing of a conductive tipped stylus over the surface of the pad); and, European Patent Publication No. 574,213 (A proximity sensor includes a sensor matrix array which senses changes in capacitance between horizontal and vertical conductors connected to the position sensing pad to determine x, y, & z position information).

A particularly useful and advantageous input device is disclosed in U.S. Pat. No. 5,305,017 to Gerpheide. The Gerpheide patent discloses devices and methods which overcome the drawbacks inherent in other devices which utilize a sensing tablet or sensing surface. The devices and methods of the Gerpheide patent include a touch sensitive input pad upon which a user conveniently inputs position information with a finger. In operation, the user's finger tip is brought in close proximity to the top surface of the position sensing surface of the touch sensitive pad. The device of the Gerpheide patent detects the position of the finger tip in the x and y directions of the touchpad as well as the finger's proximity in the z direction in relation to the sensing surface. In addition to a finger, the pointing object can be any other conductive object.

The above mentioned input devices are rather easily distinguished by focusing on a particular characteristic which each device either does or does not possess. Specifically, each input device either has a mechanical switch, commonly referred to as a button, which is depressed and released so as to perform a function commonly referred to as clicking, or the mechanical switch is eliminated by replacing it with the electronic equivalent of a mechanical switch, but without moving components.

For example, a mouse button is a mechanically activated mechanism which responds to pressure so as to mechanically close or open a switch. However, some input devices have chosen to intentionally set aside mechanical switches in favor of incorporating techniques which permit the devices to electronically sense a tapping motion. For example, a finger tapping on a touchpad's touch-sensitive surface can be recognized by the appropriate touchpad circuitry as the equivalent of depressing and releasing a mechanical switch such as a mouse button.

One of the more advantageous benefits of eliminating the mechanical switch from an input device is that the click function is no longer dependent upon hardware which can fail for reasons such as repeated use or dirty contacts. Small and sensitive mechanical switches, no matter how reliable, are susceptible to wear and will eventually succumb to the effects of use or the environment.

However, it also seems that there is a distinct sense of reassurance derived by the user when an audible "click" of the mechanical switch is heard. The importance of this audible click should not be diminished. This audible feedback (response signal) advantageously provides the user with confirmation that a click function was activated, and therefore if a cursor was located in the correct position on a display screen, the desired function should also be activated. Immediate feedback from an input device can be especially crucial when the computer system or other device may take several seconds to respond or otherwise indicate that some object or process has been successfully selected or initiated by a cursor.

Figure 1:
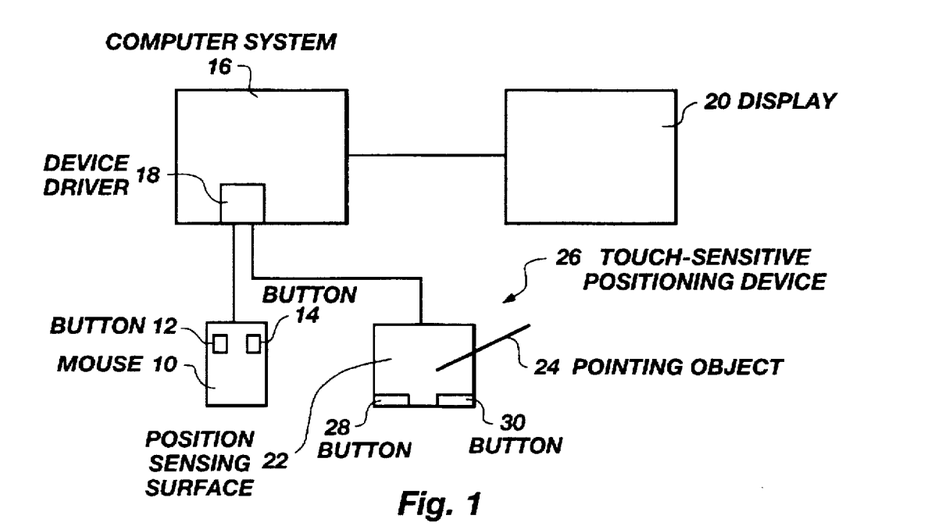
FIG. 1 is a block diagram representing available computer input devices which are the subject of the present invention.

Illustrated in FIG. 1 is a representation of a computer system 16 to which is attached a mouse 10 which acts as a cursor movement input device. The mouse 10 generally includes two buttons 12 and 14 which are activated by the user to provide instructions to the computer 16. It is common for the computer to include a device driver 18, generally referred to as a software mouse driver 18, which interfaces the signals generated by the mouse 10 to the computer 16. The movement of the mouse 10 is translated into corresponding movement of a cursor on a display 20 which is coupled to the computer 16 in real time. The mouse driver 18 can follow any of a number of protocols which are available in the industry. In many cases, it is desirable that any input device to be used with the computer 16 be compatible therewith. Alternatively, a cursor positioning device can interface directly with the computer 16, for example via an operating system or some other technique which does not require a mouse driver.

In order to be compatible with the computer 16, any input device must provide a "click", "drag" and "gesture" function which can also be provided by the mouse 10.

The click function entails depressing and releasing one of the mouse buttons 12 or 14. In response, a cursor on a display selects or otherwise has an effect on objects displayed thereon The click function includes activities such as single, double, triple or even half clicks. For example, a one and a half click for an input device is where the user presses down on a button or surface, raises a finger so as to open a switch mechanically or electronically, and then presses down and holds the button or surface with the finger.

The drag function entails moving the cursor over text or an object on the display 20, depressing a mouse button 12 or 14, keeping the mouse button depressed while "dragging" the text or object to a new location on the display 20, and releasing the mouse button to position the text or object to the new location on the display 20.

Finally, the gesture function is relatively new to computer input methods, and has become more important for personal information managers and palmtops which lack the space for a keyboard or even a mouse. Typically, a personal information manager uses a stylus which writes directly on a touch-sensitive surface which doubles as a display screen. A gesture includes moving the cursor in a particular pattern which is recognizable by a computer driver or application software. Gestures are primarily used in pattern recognition procedures, such as translating into text the handwriting of a user who is typically holding a stylus or other pen and tablet input device such as the above described personal information manager.

Also represented in FIG. 1 is a touch-sensitive positioning device, generally referred to at 26, which includes a position sensing surface 22 and a pointing object 24. Early versions of these touch-sensitive touchpad type devices include buttons, such as those shown at 28 and 30 which emulate the functions of mouse buttons 12 and 14, respectively. However, advancements have made it possible to have a touch-sensitive device which no longer requires mechanical switch buttons to execute the click function. Instead, the touch-sensitive device requires a user to lift a finger and tap once, twice, three times, or even with half taps (clicks) on the touch-sensitive surface. The tapping and half-tapping motions are detectable by touch-sensitive circuitry which informs the driver or application software of the input action just as with a common mouse and associated mouse driver.

The consequence of replacing the mechanical switch buttons 28 and 30 of prior touch-sensitive devices was viewed as enhancing reliability because the devices would no longer depend upon mechanical switch actuation. What was not generally foreseen was the effect of removing the audible response signal which the mechanical switches provided. As stated, the audible response signal was no longer present to confirm for the user whether sufficient pressure was applied to the electronic touch-sensitive touchpad surface, or whether sufficient contact time had elapsed so as to activate or select a click actuable function, thus depriving the user of the confirmation of which a user is typically accustomed. This audible response signal is particularly important when the clicking operation on a completely electronic touch-sensitive device cannot be guaranteed to be 100 percent reliable. Thus, it would be an advance in the art to provide an electronic touch-sensitive touchpad which combines the benefits of being free of mechanical switches, yet provide the familiar audible response signal.

OBJECTS AND SUMMARY OF THE INVENTION

In view of the above described state of the art, the present invention seeks to realize the following objects and advantages.

It is a primary object of the present invention to provide a method and apparatus for developing audible response signals for electronic touch-sensitive computer input devices.

It is another object of this invention to provide a method and apparatus for developing audible response signals for non-mechanical electronic touch-sensitive computer input devices which are particularly adapted for use with a touchpad type computer input and pointing device.

It is yet another object of this invention to provide a method and apparatus for developing audible response signals for non-mechanical electronic touch-sensitive computer input devices which can operate with a user's finger as the only pointing object.

It is a further object of this invention to provide a method and apparatus for developing audible response signals for non-mechanical electronic touch-sensitive computer input devices which can be independent of specific application software.

It is a further object of this invention to provide a method and apparatus for developing audible response signals for non-mechanical electronic touch-sensitive computer input devices which is implemented at a software driver level so as to be application independent.

It is a further object of this invention to provide a method and apparatus for developing audible response signals for non-mechanical electronic touch-sensitive computer input devices where the generated sound is modifiable so as to create a unique audible response signal response for each touch function sequence which is actuable by the touch-sensitive device.

These and other objects are realized in a method and apparatus for developing an audible response signal to a tapping motion, a gesture or a series of taps or gestures on an electronic touch-sensitive computer input device which uses an electronic switch having no mechanical switch component. In particular, the present invention is beneficial for a touch-sensitive input device such as a touch-pad or stylus and tablet because without audible response signals, it is difficult for the user to know whether a tapping motion is perceived by the input device's sensing circuitry. Therefore, the method above is less than perfectly reliable because sufficient pressure may not be applied to the touch-sensitive surface of the device, or contact time with the pad may be insufficient. Consequently, the user must wait to see if the computer responds in the desired manner. If not, the user must repeat the motion.

In order to overcome losing the benefit of an audible mechanical switch, the present invention develops audible response signals by generating a sound or sounds for each individual tap or gesture only after the entire combination of taps or gestures is entered and a counter times out, after each individual tap or gesture, or a combination of the two methods.

The apparatus of the present invention preferably includes an electronic touch-sensitive touch-pad or stylus and tablet having a surface which can be used as if it were a mechanical switch, an associated processing device such as a computer, a display device associated with the computer and displaying a cursor, and a sound generator coupled to the system. The sound generation can take place either directly in the touch-sensitive device or in the computer.

The method of the present invention includes the steps of detecting when an individual tap or a tap function sequence comprised of multiple taps occurs on the touch-sensitive device, and then providing an appropriate and preselectable audible response signal to the user. The audible response signal can take the form of any sound which can be generated by the sound generation system, or even a prerecorded voice message if the sound generation system is capable.

These and other objects, features, advantages and alternative aspects of the present invention will become apparent to those skilled in the art from a consideration of the following detailed description taken in combination with the accompanying drawings.

DETAILED DESCRIPTION OF THE INVENTION

In order to better appreciate how the above-recited and other advantages and objects of the invention are obtained, reference will now be made to the drawings in which the various elements of the present invention will be given numerical designations and in which the invention will be discussed so as to enable one skilled in the art to make and use the invention.

Figure 2:
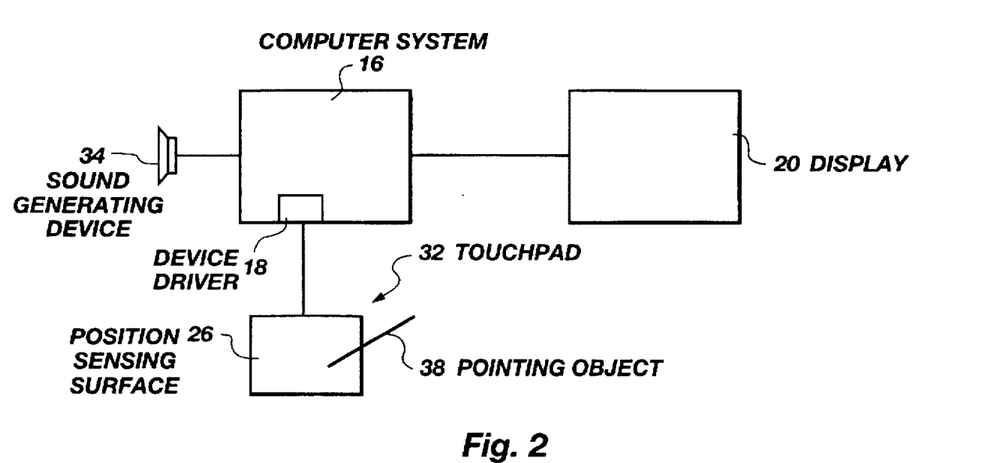
FIG. 2 is a block diagram representing the structure of a particular embodiment of the present invention described herein using a non-mechanical electronic touch-sensitive touchpad input device.

FIG. 2 is a block diagram which shows the system of FIG. 1, but with two important changes. Although not required, the mouse 10 has been removed, and the touch-sensitive device 26 is now replaced with a touch-pad 32 with no buttons. It is important to remember that the present invention does not require that input devices with mechanical switches not be used. For illustration purposes only, all input devices with mechanical switches are removed so that no confusion exists about the benefits of the present invention. It is also noted that using an input device with a mechanical switch would simply be redundant. However, the audible response signal provided by the present invention could also be toggled on or off. This option could be desirable if the input device was equipped with both a mechanical switch button and an electronic equivalent. This option might also be important depending upon the location of the mouse driver which sends signals to a sound generation system, which will be explained in greater detail.

This system in FIG. 2 is also shown with the device driver 18 for the touch-pad, but it should be remembered that this driver is not required if an alternate implementation is chosen. For example, using a direct interface to the operating system. In addition, a sound generating device 34 (speaker) is explicitly shown as a component of the system. A typical operating environment for the present invention includes an associated sound generating device, but this is made explicit in FIG. 2. Furthermore, while a stylus 38 is shown, any pointing device such as a user's finger could just as easily and often more conveniently be used to touch the surface 36 of the touchpad.

The touchpad has a position sensing surface which senses the position of a pointing object, such as a stylus or a user's finger, which is manipulated by the user. The touchpad also includes an interface circuit which includes those components, whether embodied in software, firmware, or hardware, which are necessary to interpret the position information obtained from the touchpad to industry standard signals understandable by the host computer. The host computer may include a component or driver, for example a mouse driver, or some other cursor positioning utility to interpret the signals received from the touchpad. Alternatively, those skilled in the art can arrive at many other techniques for the touchpad to communicate with the host computer.

It is particularly preferred that the touch sensitive pointing device which is described in U.S. Pat. No. 5,305,017 be used with the present invention. The touch sensitive pointing device described in U.S. Pat. No. 5,305,017 is particularly advantageous in that the cursor positioning, clicking, and dragging functions can all be accurately carried out by a user using only a single finger as a pointing object. Other advantages of the touch sensitive pointing device described in U.S. Pat. No. 5,305,017 are described therein or will be apparent from use of the invention. U.S. Pat. No. 5,305,017 is now incorporated herein by reference in its entirety. Using the information set forth in U.S. Pat. No. 5,305,017 and the information set forth herein, a system for carrying out the present invention can be readily arrived at by those skilled in the art. Importantly, the present invention is readily adaptable for use with numerous other pointing devices such as those mentioned earlier.

The touch-sensitive pointing device of the present invention is connected to the host computer 112. The host computer 112 is connected to a display 116 upon which various text and other objects are displayed and a cursor controlled by the touchpad is located.

Figure 3:
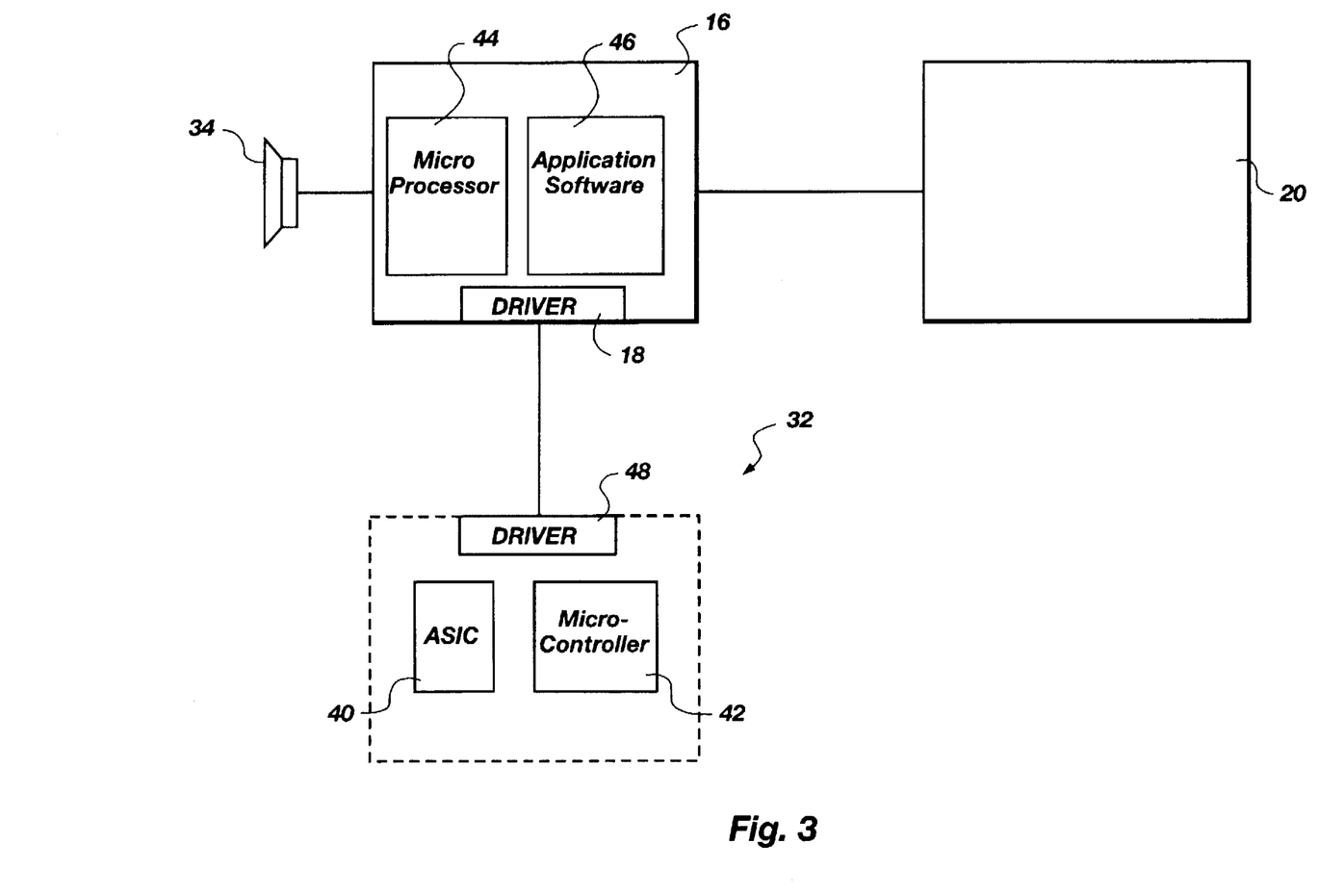
FIG. 3 is a block diagram illustrating in more detail some of the specific elements of the apparatus of the present invention.

Some underlying details of the apparatus of the present invention are shown in FIG. 3. This figure shows in block diagram form a preferred embodiment for the layout of components, both hardware and software, of the present invention. Specifically, the sensing and sensing interpretation capabilities of the touchpad are contained within an Application Specific Integrated Circuit (ASIC) 40. A microcontroller is also shown as separate from the ASIC. The host computer 16 has a microprocessor 44 which is executing application software 46, and the previously mentioned software driver 18.

An alternative embodiment within the scope of the invention is the configuration of combining the ASIC and microcontroller into a single integrated circuit. As memory capabilities increase and costs decrease for microcontrollers, this arrangement is becoming more attractive for the user.

Another alternative embodiment which also comes within the scope of this invention is removing the software driver 18 from the host computer 16 and placing the software driver 48 on the touchpad. This configuration may be preferred depending upon the resources of the host computer as well as the touchpad. The software driver might not even need to be removed. Instead, the user might have the option of choosing which software driver receives the touchpad position signals for the cursor.

The present invention also envisions a method for providing audible response signals to the user of a computer system or other host system which has as an input device like any of the electronic (mechanically switchless) input devices mentioned previously. In a preferred embodiment, however, the present invention is particularly useful with the Gerpheide touchpad of U.S. Pat. No. 5,305,017.

The main functional steps of the method require examination at increasingly lowers levels of implementation so as to understand how to practice the present invention. In other words, general steps are capable of being broken down into increasingly more detailed steps, and this approach is taken with the figures so as to illustrate the novelty of the present invention which is present at each level of implementation.

Furthermore, there are three different approaches to implementing the present invention which require explanation. The first method to be discussed herein is generating audible response signals for individual tapping motions, tap and hold motions, and gestures. The second method is for generating audible response signals where only for a complete tap function sequence (series of taps within a given length of time) or gesture sequence (series of gestures within a given length of time). The third method is simply the combination of the first and second methods, thus generating sound after individual taps and gestures, as well as after tap function and gesture sequences.

Figure 4A:
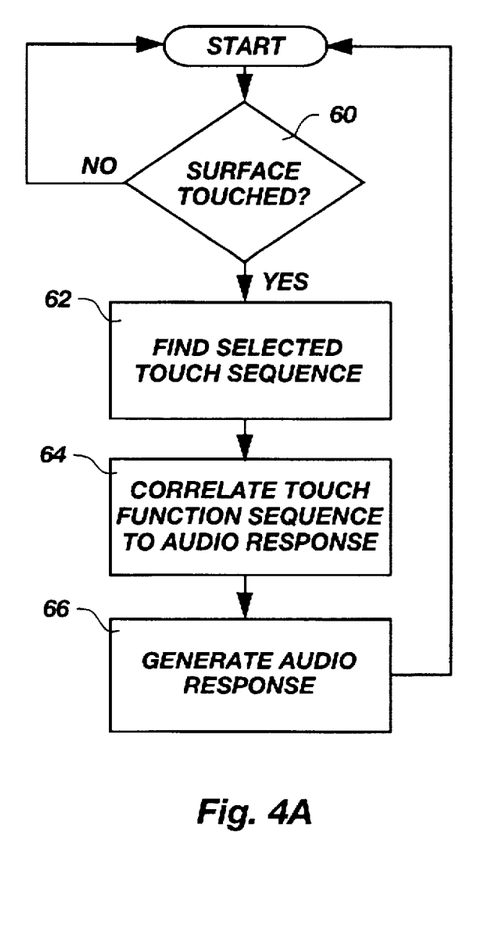
FIG. 4A is a flow chart showing the principle steps carried out by the preferred embodiment of the present invention when an audible response signal is only provided for the touch function sequence.
Figure 4B:
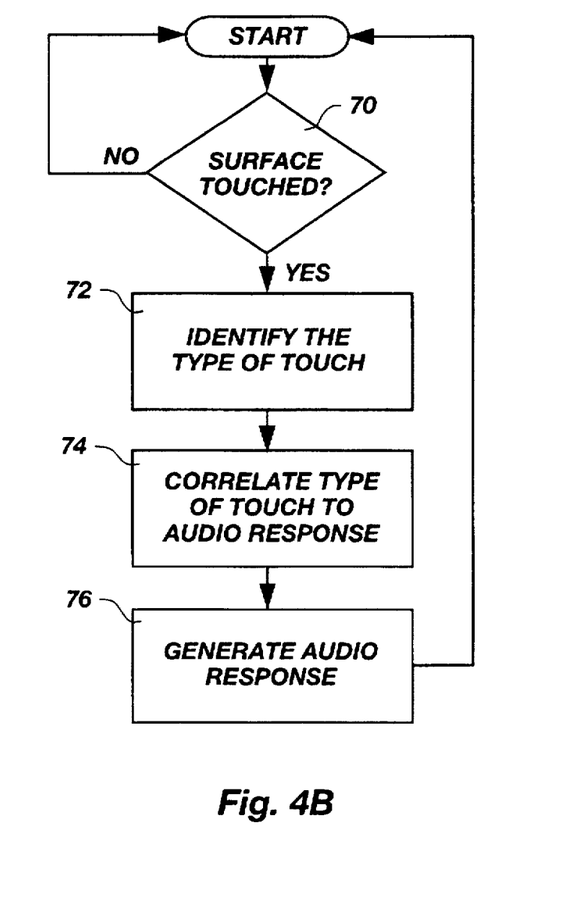
FIG. 4B is a flow chart showing the principle steps carried out by the preferred embodiment of the present invention when an audible response signal is only provided for each member of the touch function sequence.
Figure 4C:
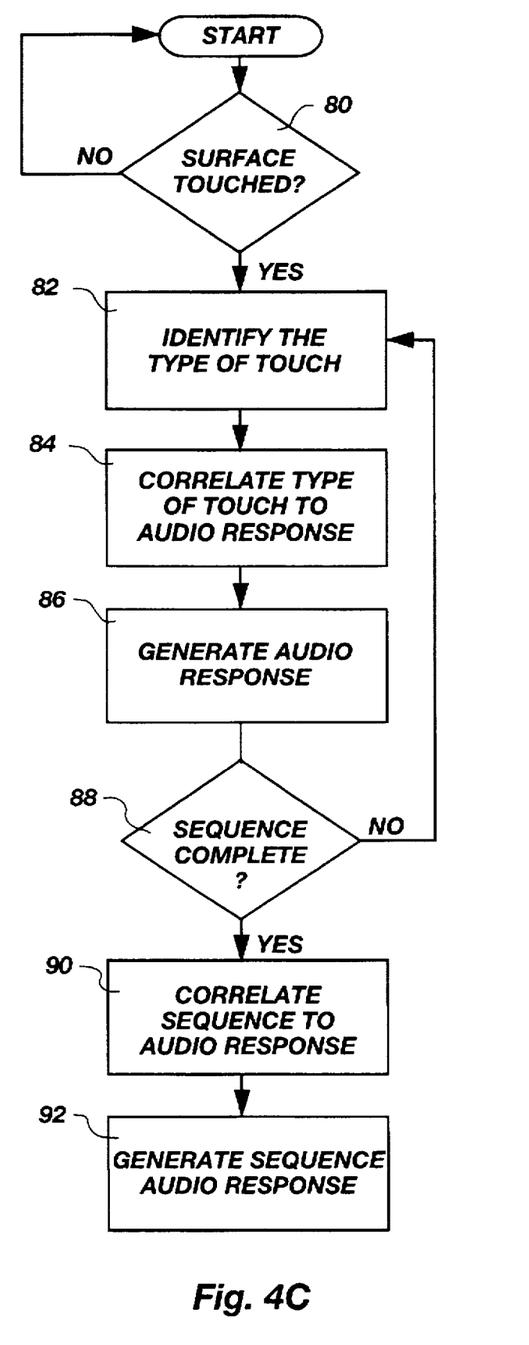
FIG. 4C is a flow chart showing the principle steps carried out by the preferred embodiment of the present invention when an audible response signal is provided for each member of the touch function sequence, as well as the touch function sequence itself.

FIGS. 4A–C are overviews of the primary methods of the present invention, and illustrate several of the key features of novelty. The present invention, as mentioned above, really encompasses three approaches to providing audible response signals. To provide greater versatility than the mechanical mouse click switch, FIG. 4A addresses the case where the system provides an audible response signal only for an entire touch function sequence, even if the sequence is a single tap or gesture. In contrast, FIG. 4B illustrates the case where the system only provides an audible response signal for each individual tap or gesture, even when a multiple of each comprise a touch function sequence. Finally, FIG. 4C illustrates the case where both methods are used. That is to say, there is an audible response signal for each individual tap or gesture, as well as for the entire touch function sequence if applicable. The decision to use one of these audible response signal methods over the others is up to the user to decide, or the manufacturer to implement. Therefore, although it is possible to have all of the audible response signal scenarios as selectable options, it is not a required element of this patent.

Beginning with the first step 60 of FIG. 4A, the method determines if a pointing object such as a user's finger has "touched" the touch-sensitive surface of the touchpad. It will be appreciated by those skilled in the art that is possible to arrive at many different methods and structures for determining when the pointing object is on, near, or in proximity to the touchpad surface. The present invention, furthermore, includes within the scope of electronic touch-sensitive input devices which suitably fill the role of touchpad, any of such devices which use capacitance, resistance, pressure, optics, or other appropriate method of sensing contact and movement by a pointing device on a touch-sensitive surface. What is important is that the touchpad have the ability to sense a tap or touch function sequence without actuation of a mechanical switch. Therefore, the mechanical and electronic switches should not be considered mutually exclusive features, as a touchpad might have both.

Having determined that a pointing object has touched the touch-sensitive surface of the touchpad, the next step 62 is to determine which touch function sequence was selected by the user. Those skilled in the art will be familiar with ways in which this determination is made. A preferred embodiment, however, includes a microcontroller executing a predefined set of steps which make this determination based on data stored in memory registers of the microcontroller. The data represents the touch function sequence which is stored in memory registers by sensing circuitry within the touchpad. The touch function sequence must be recalled sequentially from the memory in the order in which is was stored because the order touch function sequence members is critical to the touch function sequence identity.

It should be noted that this step does not exclude by its language the possibility that the only member of the touch function sequence is a single tapping on the touchpad, and this specific contingency is claimed. What the method does state is that once even a single tapping of the touchpad has been detected, the sequence of events described in FIG. 4A must be followed through to their programmed conclusion.

Once the touch function sequence is identified by a microcontroller running a predefined program, an appropriate audible response signal 66 is generated by a sound producing system (speaker), typically implemented in a host computer. The alternative is to implement sound within the touchpad if the system is a palmtop-type computer. Those skilled in the art will appreciate that there are many ways to implement this function. A preferred embodiment entails using the same look-up table used to identify the touch function sequence, by associating with each of the preselected touch function sequences a certain audible response signal. The responses might also be user selectable so as to provide customization of a computer system to the tastes of the user.

The audible response signal is generated in a preferred embodiment by sending a signal from the touch-sensitive device to the host computer through a mouse driver which instructs the speaker to play a predefined sound or prerecorded and digitized message. Those skilled in the art will appreciate the numerous methods for instructing a speaker how to play a sound.

The flowchart of FIG. 4B is only slightly different in appearance from FIG. 4A, yet implementation is much simpler. This does not become apparent when examining the method at this level of detail, but will be apparent later. It should be sufficient to say that the process of FIG. 4B is very straightforward because it does not require waiting for a touch function sequence to be complete as is required by step 62 of FIG. 4A. The method can provide immediate audible feedback as soon as the touchpad is touched, whereas FIG. 4A as will be explained, requires some sort of delay loop and timer before a sound can be generated. Therefore, the steps include waiting for touch sensing circuitry to indicate that the touchpad surface was touched in step 70, identifying the type of touches as a tap, half tap or gesture in step 72, correlating the type of touch to an audible response signal in step 74, and finally generating the appropriate audible response signal in step 76.

The flowchart of FIG. 4C becomes slightly more complicated when both methods of FIGS. 4A and 4B must be implemented simultaneously. It is probably sufficient to say that each member of the touch function sequence has an audible feedback response generated, and then the entire sequence has an appropriate touch function sequence audible feedback response generated after some timer indicates that no further input can be made to the touch function sequence.

Nevertheless, walking through the steps shows that after a pointing device is detected touching the touchpad surface in step 80, the method requires immediate identification of the type of touch as a tap, half tap or gesture in step 82. The identified touch is then correlated to a sound and that sound is generated in steps 84 and 86. If the sequence is not complete, step 88 causes the sequence to repeat. Otherwise, steps 90 and 92 correlate the touch function sequence to a corresponding audible response signal, and that audible response signal is generated.

Figure 5A:
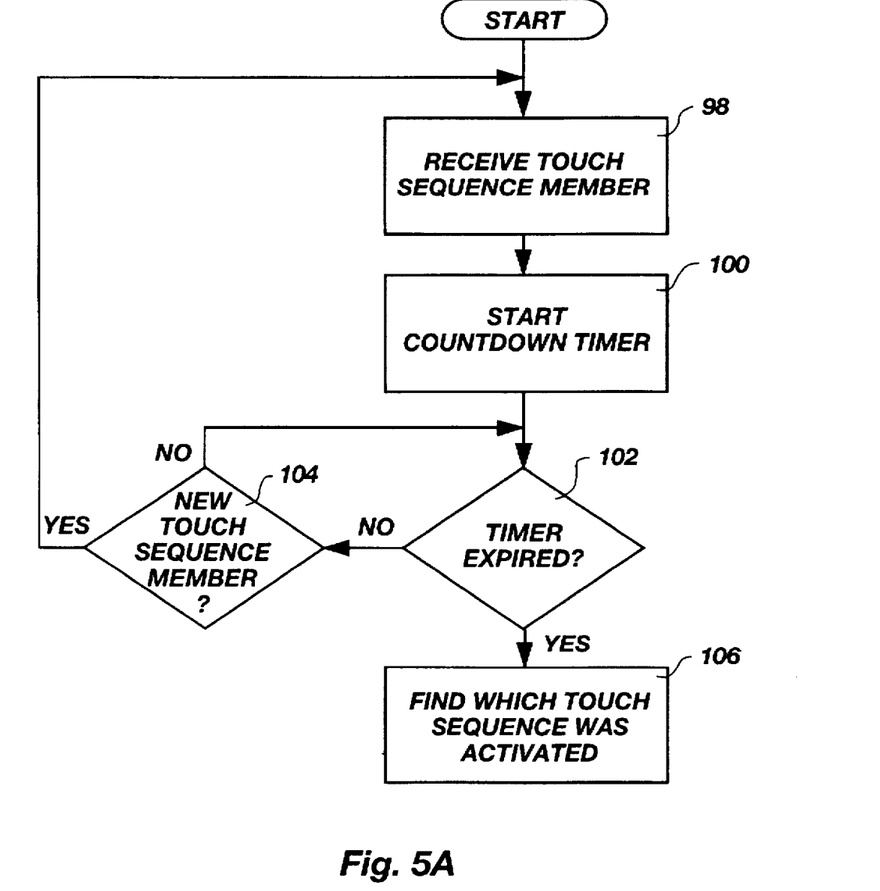
FIG. 5A is a flow chart showing more particular steps of the method described in FIG. 4A.

FIG. 5A is an illustration of a lower level of implementation of FIG. 4A. Specifically, step 62 of FIG. 4A is replaced by steps 100, 102 and 104 of FIG. 5A. Step 62 of FIG. 4A involves the step of determining which touch function sequence has been activated. Those skilled in the art will appreciate several ways to implement this step, but the preferred and illustrated method in FIG. 5A begins by starting a countdown timer in step 100 when a begin countdown signal is generated when a new touch function sequence begins. The begin countdown signal is generated by the touchpad when the contact is made with the touchpad surface and the countdown timer is expired. If the countdown timer is expired, then the touchpad know that a new touch function sequence has just begun. The countdown timer is the maximum amount of time a user has within which to touch the touchpad and have that subsequent touch included as part of a touch function sequence which started the countdown timer. That is to say, an audible feedback response will be generated when the countdown timer reaches zero and no more touch function sequence members can be added.

After the countdown timer is started, the next step 102 is to enter a loop which repeatedly queries the countdown timer to determine if it has expired. If it has not, the touchpad checks to see if a pointing device has made contact with the touchpad in step 104. This loop of steps 102 and 104 repeats itself until one of two conditions occurs. That is, if the user touches the touchpad in step 104 causing a new touch function sequence member to be generated in step 98, the countdown timer is reset in step 100, and the countdown timer begins to count down again.

Eventually, however, the user will not touch the touchpad after a touch function sequence has been fully entered. In this case, the method proceeds to step 106 which determines which touch function sequence was entered by the method previously mentioned. Steps 64 and 66 of FIG. 4A are then executed so as to generate the corresponding sound for the identified touch function sequence.

Figure 5B:
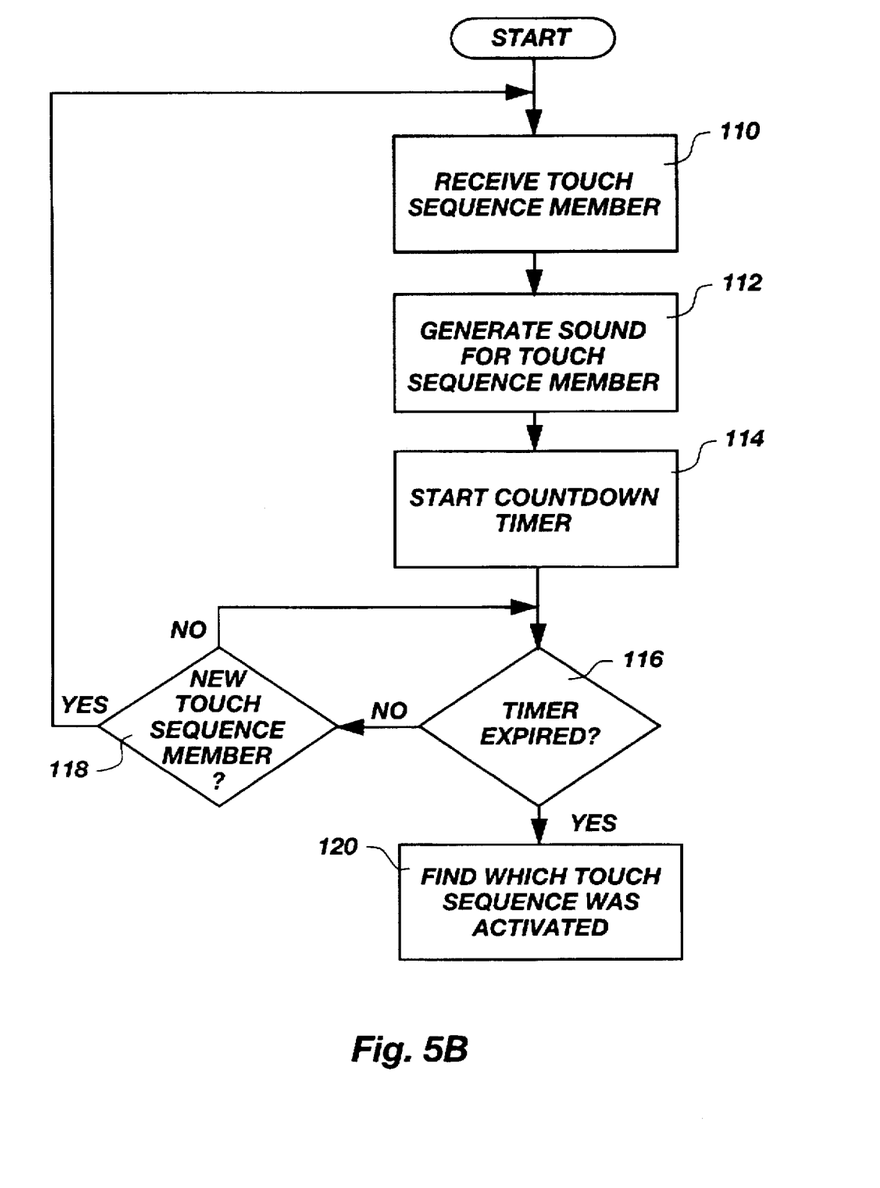
FIG. 5B is a flow chart showing more particular steps of the method described in FIG. 4C.

FIG. 5B illustrates the case where audible feedback is generated for each touch function sequence member, as well as for the entire touch function sequence. Therefore, FIG. 5B differs from FIG. 5A only in that step 112 is added so that an audible feedback response takes place within the loop which waits for the sequence countdown timer to expire, the loop consisting of steps 110, 112, 114, 116 and 118.

Figure 6A:
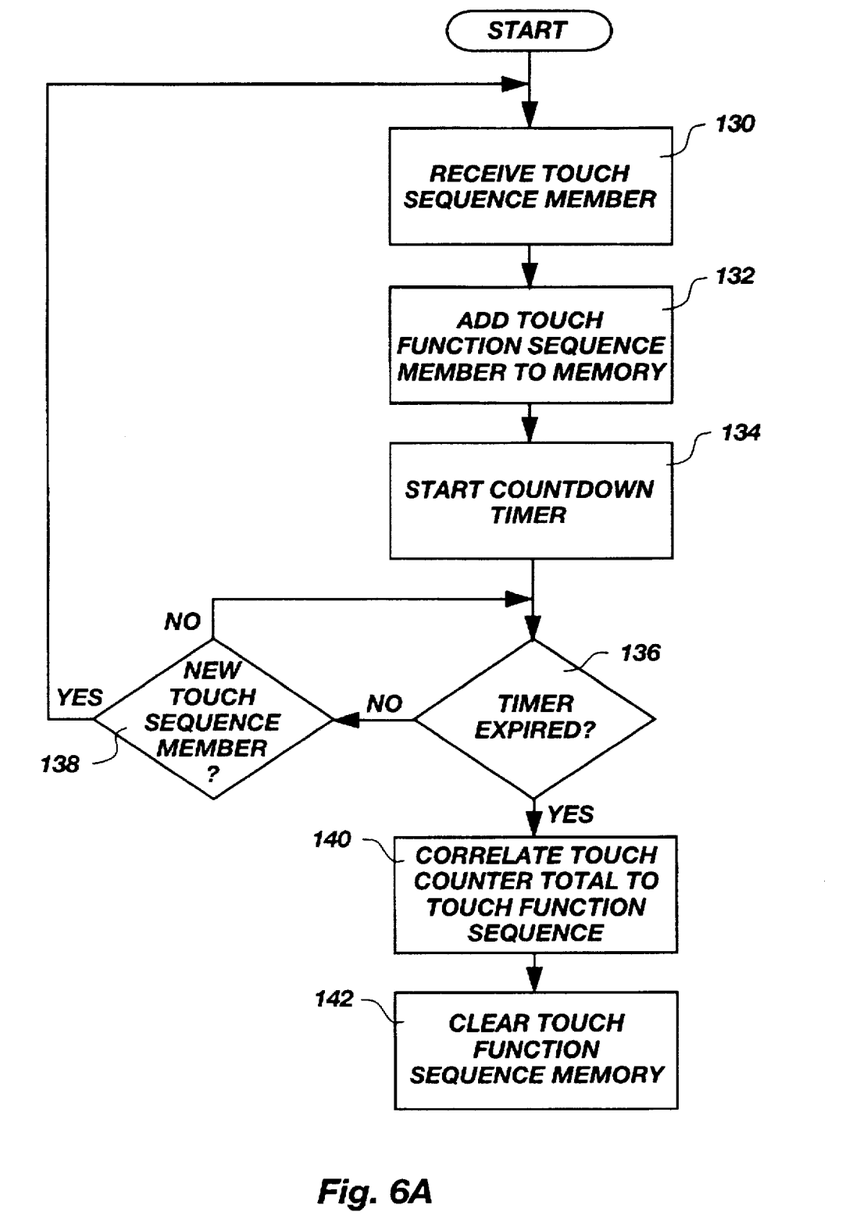
FIG. 6A is a flow chart showing more particular steps of the method described in FIG. 5A.

FIG. 6A illustrates modifications to the flowchart of FIG. 5A which now shows a specific embodiment of how the present invention determines which touch function sequence was selected. Specifically, step 130 begins with receiving the touch sequence member from the touch-sensitive circuitry. Important to the newly illustrated process is step 132 which adds new touch function sequence members to a previously reset or initialized touch function sequence memory. The touch function sequence memory is implemented by the touchpad to track the touch function sequence members within each touch function or gesture sequence, including half taps (touch and hold instead of release). By recalling the touch function sequence from the touch function sequence memory, it is a simple matter to compare the touch function sequence against a look-up table to find the appropriate preselected audible response signal. The method still includes the steps of starting the countdown timer in step 134, and checking to see if the timer expired in step 136. If not, the touchpad checks for a new touch sequence member to appear in step 138. If the timer expires before a new touch sequence member is detected, the method identifies the touch function sequence with the look-up table and correlates it to a corresponding preselected audible response signal in step 140. At the end of the process is the additional step 142 of resetting the touch function sequence memory if it requires clearing so that the next touch function sequence begins with zero entries.

Not specified in the description above is how taps and half-taps are distinguished from each other if a counter is only being incremented. Although there are many ways to implement this function which those skilled in the art will understand, the preferred embodiment of the present invention goes beyond a simple incrementation of a counter as in step 132. Specifically, the touch-sensitive circuitry will identify the type of contact made and save identification information in an array of memory registers information. When the touch function sequence countdown timer has expired, the touchpad microcontroller will compare the actual touch function sequence, including any half taps or gestures, to a look-up table to find the corresponding sound previously determined for the particular touch function sequence in question.

Figure 6B:
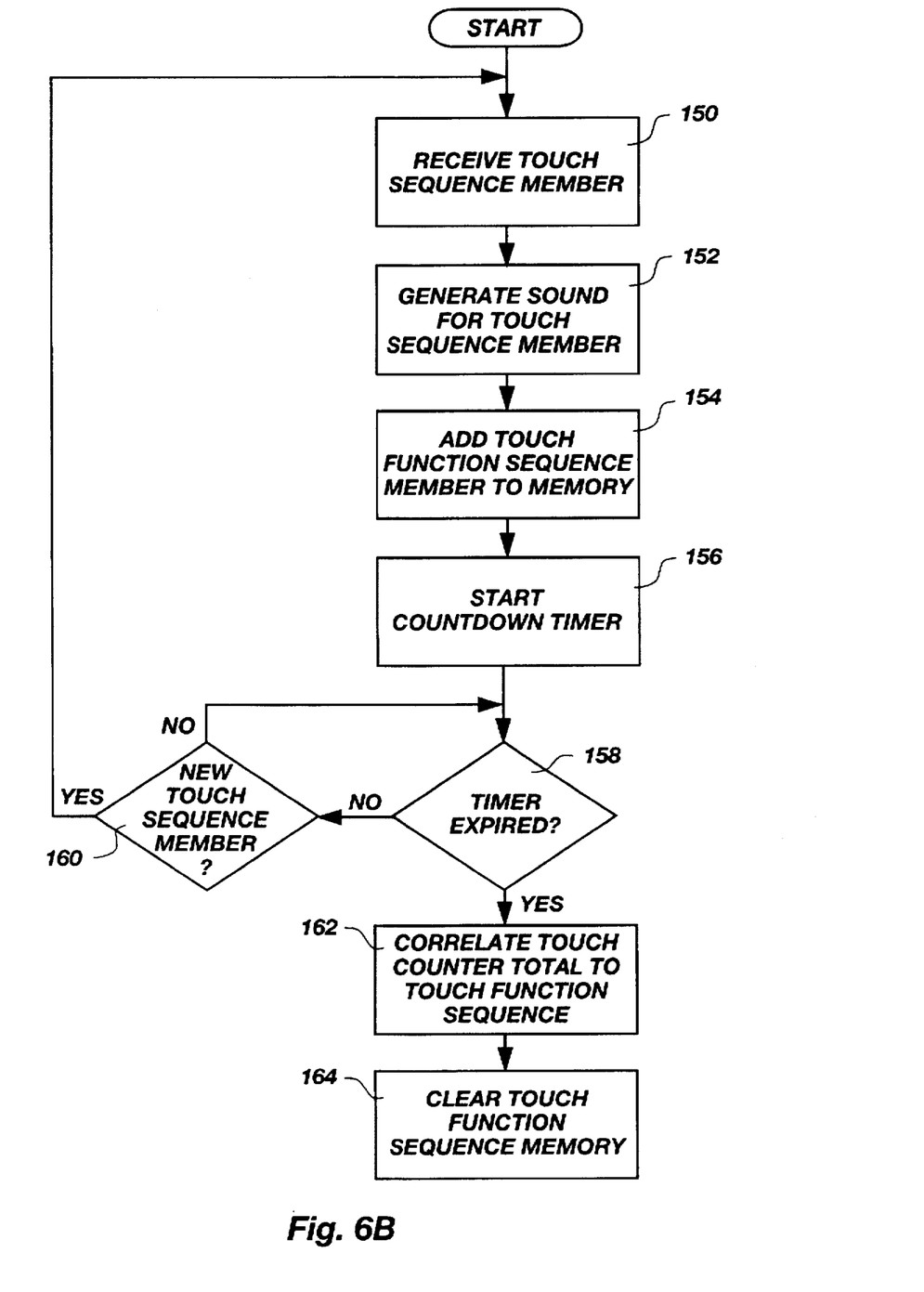
FIG. 6B is a flow chart showing more particular steps of the method described in FIG. 5B.

FIG. 6B only requires the addition of step 152 to allow for the generation of an audible feedback response for each member of the touch function sequence for the case where sound is generated for each touch function sequence member, and the touch function sequence itself. Otherwise, steps 150, 152, 154, 156, 158, 160, 162, and 164 are executed just as in FIG. 6A.

Figure 7:
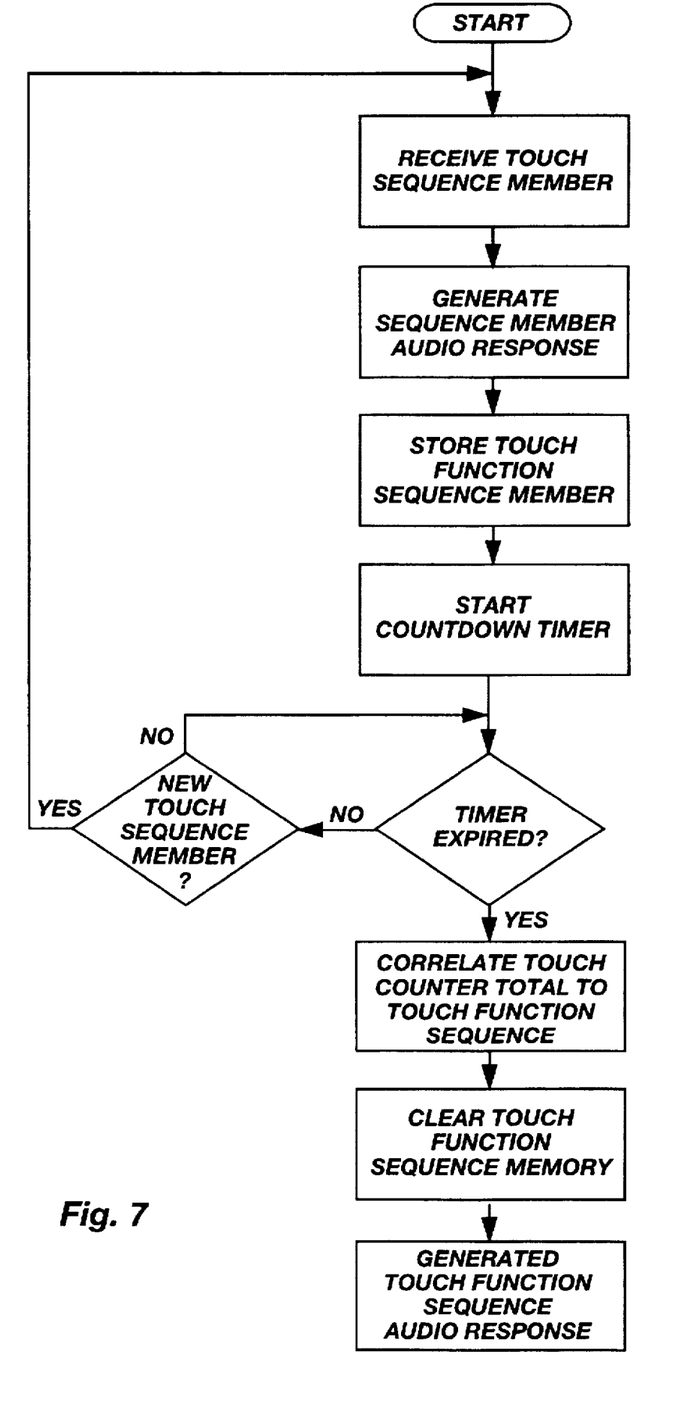
FIG. 7 is a flow chart showing more particular steps of the method described in FIG. 6B.

FIG. 7 illustrates a flowchart for implementation of the present invention including all the previous steps for implementation of the method of FIGS. 4B, 5B and 6B where both the individual touch function sequence members are provided with an audible response signal, as well as the completed touch function sequence itself.

It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for developing different audible signals for different associated contacts made by a pointing device with a touch-sensitive surface of a computer input and cursor manipulation device, said computer input and cursor manipulation device having a non-mechanical electronic switch, actuated by contact of a pointing device with the touch-sensitive surface, to thereby emulate an audible mechanical switch, said method comprising the steps of:

(a) developing an electrical signal in response to contact by the pointing device with the touch-sensitive surface, the electrical signal indicating actuation of the non-mechanical switch;

(b) storing associated electrical signals for subsequent sequential recall from a memory which stores said electrical signals as a touch function sequence;

(c) comparing a touch function sequence stored in the memory with a plurality of preselected touch function sequences, to identify which preselected sequence matches the stored touch function sequence, each of which is associated with a certain audible response signal;

(d) transmitting to a sound producing device the audible response signal associated with the identified preselected touch function sequence; and (e) activating said sound producing device by the audible response signal to cause the sound producing device to generate a corresponding audible response.

2. The method as defined in claim 1 wherein the step of developing an electrical signal which indicates actuation of the non-mechanical switch comprises the further steps of:

(a) identifying what type of contact was made between the pointing device and the touch-sensitive surface; and (b) storing the type of contact as data within the memory.

3. The method as defined in claim 2 wherein the step of categorizing what type of contact was made between the pointing device and the touch-sensitive surface comprises the further step of categorizing the type of contact as a tap, a half-tap or a gesture.

4. The method as defined in claim 1 wherein the step of storing associated electrical signals such that they may be recalled sequentially from memory comprises the more specific steps of:

(a) clearing the touch function sequence memory and starting a countdown timer when contact is made with the touch-sensitive surface; and (b) restarting the countdown timer if contact is made with the touch-sensitive surface before the countdown timer has expired.

5. The method as defined in claim 1 wherein the step of comparing the touch function sequence stored in the memory with the plurality of preselected touch function sequences comprises the more specific step of using a look-up table stored in the memory and comparing the touch function sequence in memory to said table so as to identify which of the plurality of preselected touch function sequences was stored.

6. The method as defined in claim 5 wherein the step of comparing the touch function sequence to a plurality of preselected touch function sequences comprises the more specific step of, after identifying the preselected touch function sequence, recalling from the same look-up table the associated audible response signal.

7. The method as defined in claim 1 wherein the step of generating the corresponding audible response signal includes the step of generating sounds independent of sounds generated by application software.

8. The method as defined in claim 1 wherein the step of generating the corresponding audible response signal includes the steps of:

(a) generating a signal from a microcontroller within the touch-sensitive device, said signal including the audible response signal associated with the identified preselected touch function sequence; and (b) transmitting the signal to a driver, said driver causing the computer to generate the corresponding audible response signal using the sound producing device.

9. A method for developing different audible signals for each contact made by a pointing device with a touch-sensitive surface of a computer input and cursor manipulation device, said computer input and cursor manipulation device having a non-mechanical electronic switch, actuated by contact of a pointing device with the touch-sensitive surface, to thereby emulate an audible mechanical switch, said method comprising the steps of:

(a) developing an electrical signal in response to contact by the pointing device with the touch-sensitive surface, the electrical signal indicating actuation of the non-mechanical switch;

(b) storing associated electrical signals for subsequent sequential recall from a memory which stores said electrical signals as a touch function sequence;

(c) comparing a touch function sequence stored in the memory with a plurality of preselected touch function sequences, to identify which preselected sequence matches the stored touch function sequence, each of which is associated with a certain audible response signal;

(d) transmitting to a sound producing device the audible response signal associated with the identified preselected touch function sequence; and (e) activating said sound producing device by the audible response signal to cause the sound producing device to generate a corresponding audible response.

10. The method as defined in claim 9 wherein the step of identifying what type of contact was made between the pointing device and the touch-sensitive surface comprises the further step of identifying the type of contact as a tap, a half-tap or a gesture.

11. The method as defined in claim 9 wherein the step of comparing the touch function stored in the memory with the plurality of preselected touch functions comprises the more specific step of using a look-up table stored in the memory and comparing the touch functions so as to identify which of the plurality of preselected touch function sequences was selected.

12. The method as defined in claim 9 wherein the step of comparing the identified touch function to a plurality of preselected touch functions comprises the more specific step of, after identifying the preselected touch functions, recalling from the same look-up table the associated audible response signal.

13. The method as defined in claim 9 wherein the step of generating the corresponding audible response signal includes the step of generating sounds independent of sounds generated by application software.

14. The method as defined in claim 9 wherein the step of generating the corresponding audible response signal includes the steps of:

(a) generating a signal from a microcontroller within the touch-sensitive device, said signal including the audible response signal associated with the identified preselected touch function sequence; and (b) transmitting the signal to a driver, said driver causing the computer to generate the corresponding audible response signal using the sound producing device.

15. A method for developing different audible signals for each individual contact and for a related sequence of contacts made with a computer input and cursor manipulation device, said computer input and cursor manipulation device having a non-mechanical electronic switch actuated by contact with the touch-sensitive surface, to thereby emulate an audible mechanical switch, said method comprising the steps of:

(a) developing an electrical signal when contact is made by the pointing device with the touch-sensitive surface, the electrical signal indicating actuation of the non-mechanical switch;

(b) identifying what type of contact was made between the pointing device and the touch-sensitive surface as a touch function;

(c) comparing the touch function to a plurality of preselected touch functions, to identify which of the plurality of preselected touch functions matches the touch function, each of which is associated with a certain audible response signal;

(d) transmitting to a sound producing device the audible response signal associated with the identified preselected touch function;

(e) activating said sound producing device by the audible response signal to cause the sound producing device to generate a corresponding audible response signal;

(f) storing associated electrical signals for subsequent sequential recall from a memory which stores said electrical signals as a touch function sequence;

(i) transmitting to a sound producing device the audible response signal associated with the identified preselected touch function sequence; and (j) activating said sound producing device by the audible response signal to cause the sound producing device to generate a corresponding audible response.

16. A system for developing audible feedback indicating contact by a pointing device with a touch-sensitive surface of a computer input and cursor manipulation device, said computer input and cursor manipulation device having a non-mechanical switch actuated by contact of a pointing device with the touch-sensitive surface, to thereby emulate an audible mechanical switch, said computer input and cursor manipulation being comprised of:

(a) means for sensing contact by the pointing device on the touch sensitive surface, and developing an electrical signal in response to said contact;

(b) means for storing associated electrical signals in memory for sequential recall;

(c) means for comparing the associated electrical signals stored in the memory to selectable electrical signal patterns to as to identify which electrical signal patterns were stored;

(d) means for comparing the identified electrical signal pattern to preselected audible response signals so as to identify a corresponding audible response signal; and (e) means for generating the corresponding audible response signal.

17. The system as defined in claim 16 wherein the means for correlating the identified touch function sequence to a preselected audible response signal comprises a look-up table stored in a memory.

18. The system as defined in claim 16 wherein the means for sensing contact comprises a touchpad means.

19. The system as defined in claim 16 wherein the pointing object is a human finger.

20. The system as defined in claim 16 further comprising means for interfacing the means for sensing contact by the pointing device on the touch sensitive surface with a mouse driver.

21. The system as defined in claim 16 further comprising:

(a) mouse driver means;

(b) means for interfacing the means for sensing contact by the pointing device on the touch sensitive surface with the mouse driver means;

(c) computing means for processing information received from the mouse driver means and other input devices; and (d) display means, coupled to the computer means, for displaying in real time a cursor in a location indicated by the mouse driver.

22. The system as defined in claim 16 further comprising:

(a) mouse driver means;

(b) means for interfacing the means for sensing contact by the pointing device on the touch sensitive surface with the mouse driver means;

(c) computing means for processing information received from the mouse driver means and other input devices; and (d) display means, coupled to and physically overlapping the surface sensing means, for displaying in real time a cursor in a location indicated by the mouse driver.

* * * * *